United States Patent [19]

Hampton et al.

[11] Patent Number: 5,775,059
[45] Date of Patent: Jul. 7, 1998

[54] METHOD AND APPARATUS FOR COMPACTING AND WINDING FLAT STOCK

[75] Inventors: Marshall B. Hampton; Larry J. Mattson; Ronald O. Simpson, all of Charlotte, N.C.

[73] Assignee: Alcoa Closure Systems International, Inc., Crawfordsville, Ind.

[21] Appl. No.: 785,982

[22] Filed: Jan. 21, 1997

[51] Int. Cl.⁶ .................................................. B65B 63/04
[52] U.S. Cl. ........................... 53/429; 53/430; 53/438; 53/474; 53/117; 53/118; 53/529; 53/238; 53/239
[58] Field of Search ...................... 53/116, 117, 118, 53/119, 120, 155, 156, 157, 429, 430, 445, 474, 438, 529, 238, 239

[56] References Cited

U.S. PATENT DOCUMENTS

| | | | |
|---|---|---|---|
| 2,057,698 | 10/1936 | Thayer | 53/429 |
| 3,280,533 | 10/1966 | Hall | 53/119 |
| 4,385,478 | 5/1983 | Veerkamp | 53/118 |
| 4,575,986 | 3/1986 | Willett et al. | 53/118 |
| 4,601,154 | 7/1986 | Ausnit | 53/119 |
| 5,005,336 | 4/1991 | Bloom | 53/471 X |
| 5,056,659 | 10/1991 | Howes et al. | |
| 5,152,121 | 10/1992 | Nakamura | 53/117 X |

Primary Examiner—Daniel Moon
Attorney, Agent, or Firm—Rockey, Milnamow & Katz, Ltd.

[57] ABSTRACT

A method of compacting a bill from a flat state into a pleated and wound state for position the bill in a cavity of an associated closure includes providing a bill in a substantially flat state and pleating the bill in a first direction to provide a series of substantially similar pleats. The pleated bill is compacted to set the pleats therein and at least partially wound into a generally circular configuration. The wound bill is positioned within the cavity of the associated closure. An apparatus for compacting and winding the bill and positioning the bill in the closure cavity includes a pleating station for pleating the bill in a predetermined configuration and a compacting station for compacting the pleated bill into a compacted state. The apparatus further includes a winding station having a winding member adapted to engage the compacted bill and to wind the bill into a generally circular orientation. A discharge region is adapted to move the wound bill from the winding station and to position the bill in the closure cavity.

18 Claims, 4 Drawing Sheets

METHOD AND APPARATUS FOR COMPACTING AND WINDING FLAT STOCK

FIELD OF THE INVENTION

This invention relates to a method and apparatus for compacting and winding flat stock such as currency and the like. More particularly, the invention relates to a method and apparatus for pleating and winding flat stock into a wound configuration and positioning the wound stock in an associated container closure.

BACKGROUND OF THE INVENTION

Promotional campaigns have been used by soft drink bottlers for many years. One type of promotional campaign provides the purchaser with an "instant win" in the form of cash money, i.e., currency, or a coupon redeemable for money, prizes or a cash rebate. In such instant win promotional campaigns, it is highly desirable to place the currency or coupon within the soft drink container.

Caution, however, must be taken when placing the instant win game piece in the soft drink container. First, if the container is to also hold a quantity of soft drink, the game piece must be isolated from the soft drink to prevent contamination thereof. In addition, if the promotional campaign is designed such that only random containers contain game pieces, the prize containing containers cannot be outwardly distinguishable from the non-prize containing containers. Further, the containers, whether prize containing or non-prize containing should be pilfer resistant to discourage or prevent tampering with the containers to illegitimately obtain game pieces.

One known type of soft drink container includes a typical soft drink can which has a prize award holding compartment positioned inside of the can. While such a container provides the purchaser with an "instant win" game piece, it necessarily occupies a large portion of the container volume which would otherwise hold the soft drink. Moreover, in such an instant win container, if the container is to hold both soft drink as well as the game piece, the game piece must, to retain soft drink integrity, be completely isolated from the drink.

In addition, known prize containing containers may be distinguishable from other, non-prize containing containers by differences in weight, balance and the like. Such containers may also require special or additional tooling and manufacturing techniques, thus adding considerable cost to the bottling process.

Other methods of providing instant win pieces include inserts in the container closure cap. Such inserts are exemplified by printed closure liners which can be removed from the closure after the container is opened. However, it will be recognized that it is more desirable to place currency, such as one and five dollar bills, into containers to provide the purchaser with instant cash winnings.

Accordingly, there continues to be a need for a method and apparatus for compacting and winding a promotional game piece, such as currency, coupons and the like and positioning the wound game piece in a soft drink container closure. Preferably, such a method and apparatus provides a game piece which is isolated from the soft drink, and minimally, if at all, adversely impacts the volume of the container for holding the soft drink. Such a method and apparatus ideally provides a game piece which can be placed in a container without being able to distinguish the container from non-prize containing containers.

SUMMARY OF THE INVENTION

A method of compacting a bill from a flat state to a compacted, generally round, i.e., wound, configuration for positioning the bill in a cavity of an associated closure includes providing a bill in a substantially flat state and pleating the bill in a first direction to provide a series of substantially similar pleats. Preferably, the bill is pleated so that the bill includes first and last pleats which are of substantially equal size and which are similarly oriented.

The pleated bill is compacted to set the pleats therein. The pleated and compacted bill is at least partially wound into, for example, a generally circular configuration, and is positioned within a cavity of a closure cap.

In a preferred method, the bill is pleated by directing the bill between intermeshed gear teeth of an associated pair of gears. The bill may be compacted by collapsing the pleats by aspiration of the pleated bill. The compacting step may further include compressing the pleated bill with an associated compression platen and compression ram.

The bill may be wound by gripping means adapted to receive the compacted bill, and further adapted to rotate the gripping means relative to the compacted bill, to wind the bill into a predetermined configuration. In a preferred method, the bill is wound into a generally S-shaped configuration and is positioned within the closure cavity.

An apparatus for compacting and winding the bill and positioning the wound bill in the closure cavity includes a pleating station for pleating the bill in a predetermined configuration and a compression station for compressing the pleated bill into a compacted state. The compression station facilitates setting the pleats in the bill.

The apparatus includes a winding station having a winding member adapted to engage the pleated and compacted bill and further adapted to wind the bill into a generally circular orientation. The wound bill is moved to a discharge region which is adapted to position the wound bill in the cavity of the associated closure.

The apparatus may include a pair of intermeshed gears having gear teeth thereon to pleat the bill. In one embodiment of the apparatus, the compacting station includes a vacuum chamber having a vacuum manifold in flow communication therewith. The chamber is configured to draw a vacuum therein, and is adapted to receive the pleated bill and to compact the bill by aspiration thereof. In a preferred embodiment, the vacuum chamber defines a variable cross-sectional flow area throat which is adjustable commensurate with the height of the bill as it is compacted.

The compression station may include a compacting station having a compression platen and a ram for compressing the pleated bill therebetween to set the pleats.

In a preferred embodiment, the winding station includes means for winding the bill in a predetermined, generally round configuration. The bill may be gripped between a pair of pins adapted to hold the bill while the pins are rotated relative to the bill to effect the wound configuration.

Other features and advantages of the present invention will be apparent from the following detailed description, the accompanying drawings, and the appended claims.

DETAILED DESCRIPTION OF THE PREFERRED EMBODIMENTS

Figure 1:
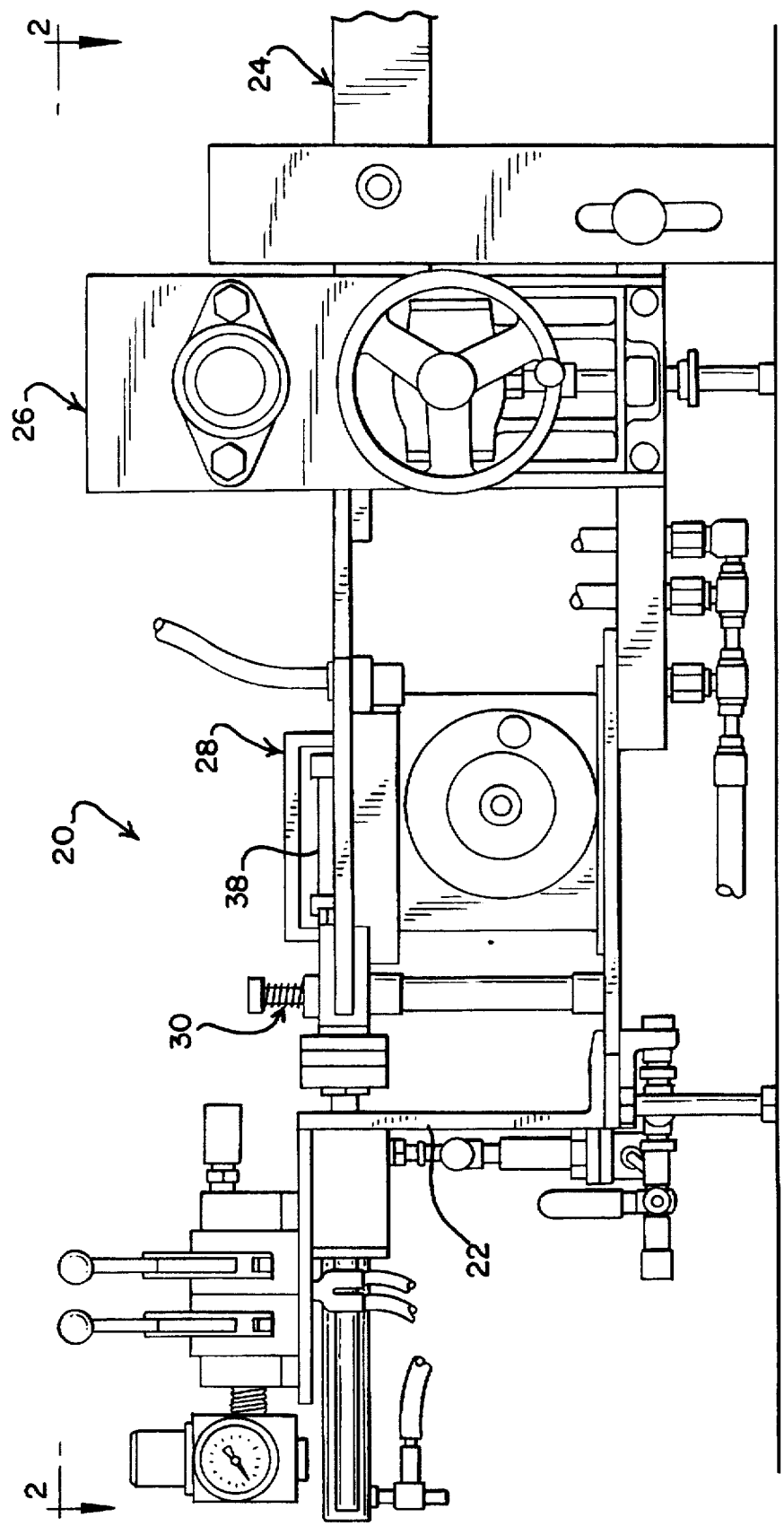
FIG. 1 is a front elevational view of an embodiment of an apparatus for compacting and winding flat stock embodying the principles of the present invention.
Figure 2:
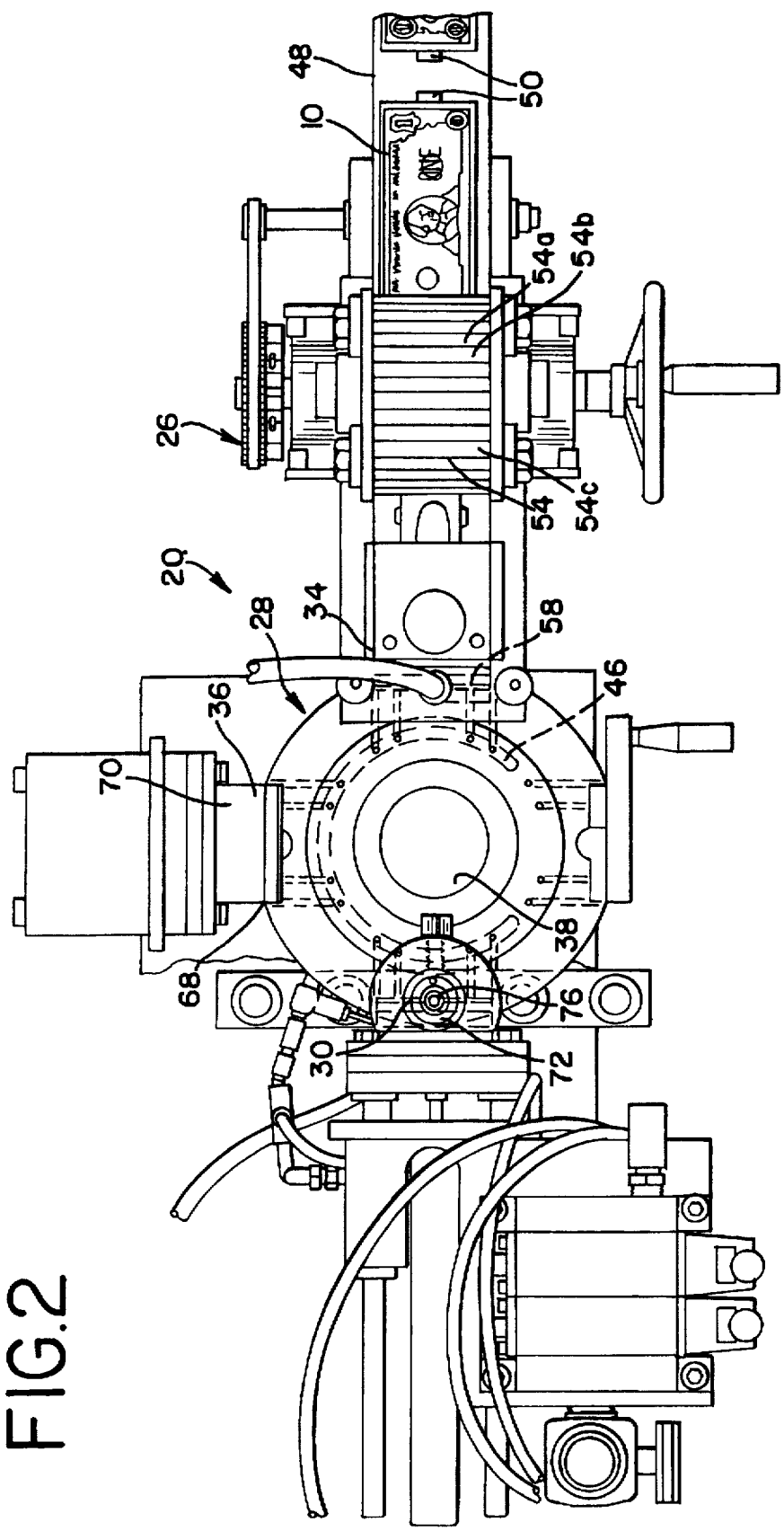
FIG. 2 is a top view of the flat stock compacting and winding apparatus of FIG. 1, as viewed from line 2—2 of FIG. 1.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 3:
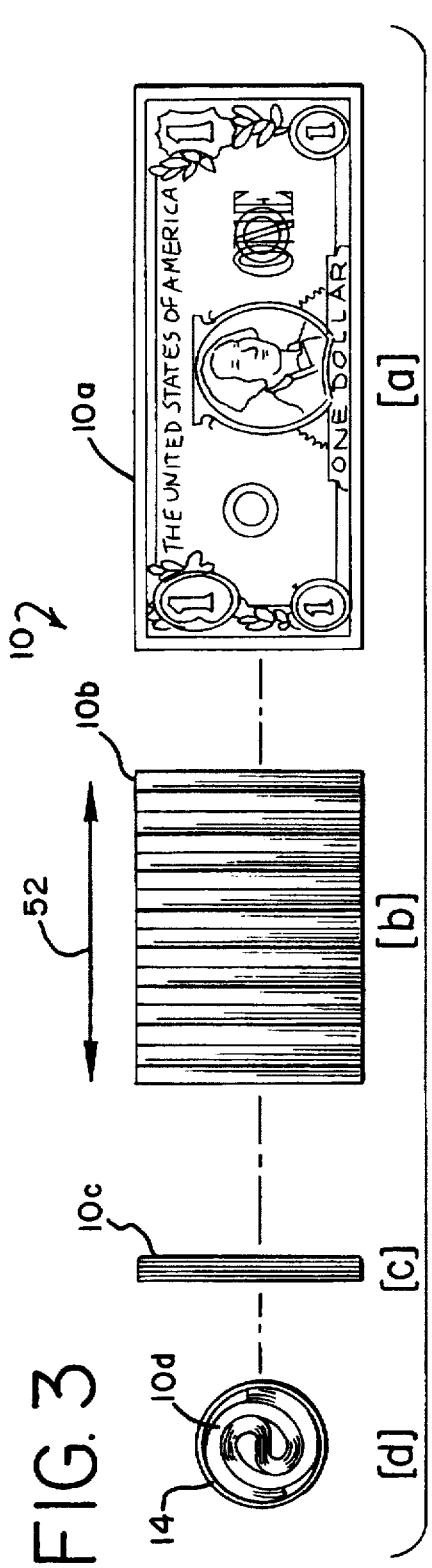
FIG. 3 is a graphical illustration of a exemplary one dollar bill, illustrating from right to left, the various stages of the bill during the compacting method.
Figure 4:
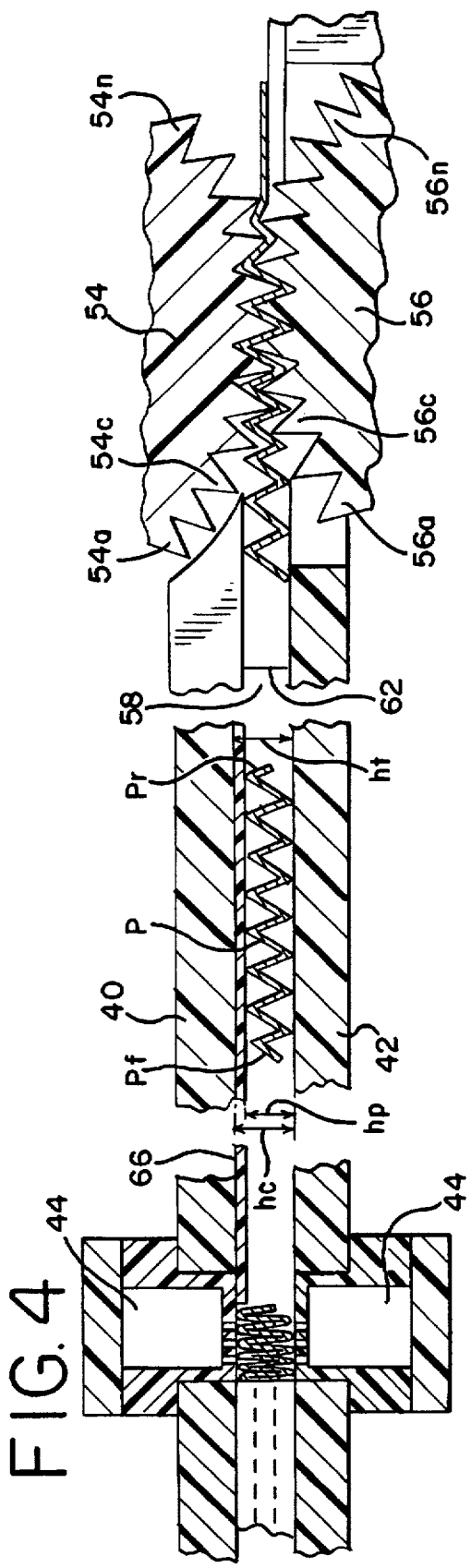
FIG. 4 is a partial cross-sectional view of the compacting and winding apparatus of FIG. 1, which shows generally, the pleating, compacting and winding of the bill of FIG. 3, in a corresponding manner to FIG. 3.
Figure 5:
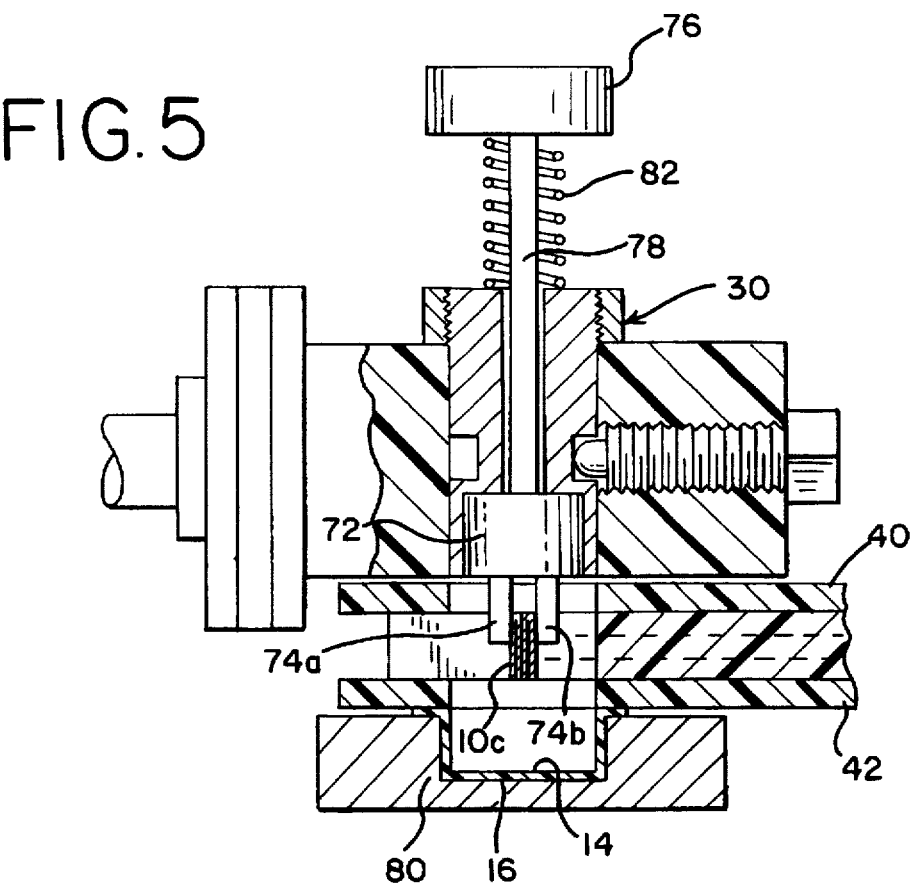
FIG. 5 is a partial cross-sectional view of the winding station of the apparatus of FIG. 1, with the bill in a compacted state, positioned therein.

FIG. 3d, illustrates an exemplary one dollar bill 10d which has been compacted and wound in accordance with the principles of the present invention. It is to be understood that the bill 10 is exemplary of any flat stock, such as paper, plastic coated paper, and the like, that may be used as a promotional game piece, and that all such flat stock is within the spirit and scope of the present invention.

The bill 10a is introduced in a flat state, as illustrated in FIG. 3a. The bill 10a is pleated in a first direction to provide a series of substantially similar pleats P or corrugations, as shown in FIG. 3b. In a preferred method, the bill 10b has first and last pleats $P_f$, $P_1$ which are similar in size and are oriented in the same direction. In the illustrated pleated bill 10b, the first and last pleats $P_f$, $P_1$ are oriented downwardly, and each the first and last pleats $P_f$, $P_1$ have a length about ¾ of the full pleat length.

The bill 10b is then compacted in the direction of the pleats P. The resulting compacted bill 10c is illustrated in FIG. 3c. In a current method, compacting is effected by aspirating and compressing the pleated bill 10b. The compacting step illustrated includes the step of compressing the bill with, for example, a compression platen. The compression step sets the pleats P in the bill 10c, as illustrated in FIG. 3c. In the compressed state, the bill 10c has a stick-like form.

The compacted bill 10c is then wound. Preferably, the bill 10c is fully wound into a generally S-shaped configuration 10d, as shown in FIG. 3d. This may be accomplished by providing gripping means to grip the bill 10c at about the center thereof between the ends and rotating the gripping means relative to the bill 10c. It is to be understood that the bill 10c can be gripped at or near an end thereof and wound to provide, for example, a spiral configuration, and that such configurations are intended to be within the spirit and scope of the present invention.

Figure 6:
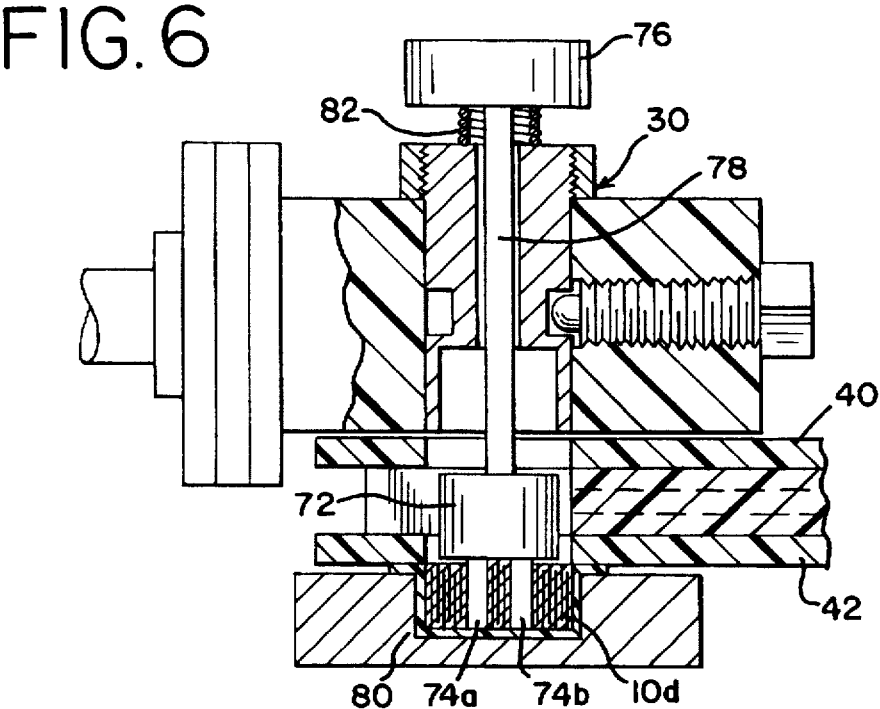
FIG. 6 is a view similar to FIG. 5, showing a partial cross-sectional view of the winding station of the apparatus of FIG. 1, with the bill in a wound state and inserted into the cavity of the associated closure cap.

As shown in FIG. 6, the wound bill 10d can then be positioned within a cavity 14 of an associated closure cap 16. As discussed below, the wound bill 10d can be positioned in the closure cavity 14 by displacing the gripping means in a direction generally axial to the axis of rotation thereof.

The pleated, compacted and wound bill 10d, positioned in the closure cap cavity 14, can then be placed on or in a soft drink container. This configuration permits positioning the game piece within the container, while isolating the game piece from the soft drink to prevent contamination thereof. Advantageously, this arrangement minimally, if at all, adversely impacts the volume of the container reserved for containing the soft drink.

An embodiment of an apparatus 20 for compacting and winding the bill 10 is illustrated in FIGS. 1-2 and 4-6. The apparatus 20 includes a frame 22 to support the various stations necessary to compact and wind the bill 10. The apparatus 20 includes an infeed station 24, a pleating station 26, a compacting station 28, a winding station 30 and a discharge region or station 32. In a current embodiment, the compacting station 28 includes an aspiration or vacuum station 34 and a compression station 36.

In the illustrated embodiment, the bill 10 is indexed from one station to the next on a turntable 38 which transports the bill 10 through the various stations. The turntable 38 includes upper and lower, generally horizontal guide plates 40, 42. The guide plates 40, 42 are positioned to securely hold and guide the bill 10 between stations. The plates 40, 42 secure the bill 10 thereto by use of a vacuum which is drawn through a vacuum manifold 44. The plates 40, 42 also include a vacuum channel 46 formed therein to facilitate guiding the bill 10 through the various stations. The vacuum channel 46 is in flow communication with the vacuum manifold 44.

The bill 10, or other flat stock, is infed to the apparatus 20 at the infeed station 24. The infeed station 24 is driven in an indexed manner to feed the bill 10 at predetermined times and intervals. The infeed station 24 includes a feed belt 48 having timing lugs 50 thereon to infeed the bill 10 to provide a desired pleating configuration.

The bill 10 is fed into the pleating station 26 in which the bill 10 is pleated in a first direction as illustrated by the arrow at 52, to provide a series of substantially similar pleats P. The pleating station 26 includes a pair of gears 54, 56 having intermeshed gear teeth 54a–n, 56a–n. As the bill 10 is directed into the gears 54, 56, the bill 10 is pleated in a predetermined configuration. Preferably, the bill is fed into the gears 54, 56 to effect pleating such that the bill has first and last pleats $P_f$, $P_1$ that are of substantially equal size and similarly orientation. In a current embodiment which is configured for standard U.S. currency, the pleated bill 10b includes about 17 pleats, with each the first and last pleat Pf, $P_1$ being about ¾ of the length of the full pleats, and each being oriented downwardly relative to the apparatus 20.

The pleated bill 10b is then compacted or reduced in the compacting station 28, to effect the configuration illustrated in FIG. 10c. In a current embodiment, the compacting station 28 includes a vacuum or aspiration station 34 and a compression station 36. In the vacuum station 34, the length of the pleated bill 10b is reduced. In the compression station 36, the pleats P are set in the bill 10, further reducing the length thereof.

The vacuum station 34 includes a vacuum chamber 58 having upper and lower chamber walls 58a,b. The chamber 58 is in flow communication with the vacuum manifold 44. The vacuum chamber 58 defines a throat 62 which is essentially the cross-sectional area across which vacuum is drawn through the chamber 58.

As the pleated bill 10b is introduced into the chamber 58, a vacuum is created therein which draws the pleated bill 10b to the end 64 which is in communication with the manifold 44. As the bill 10 is drawn into the chamber 58 and is reduced in length in the first direction 52, i.e., compacted, the compacted height $h_C$ of the bill, that is, the absolute height of the bill 10 irrespective of the pleats P, is increased over the height $h_p$ of the pleated bill 10b. This results from the decreased angles between the pleats P.

In order to accommodate the increased bill height $h_c$, the vacuum chamber 58 includes an articulating plate 66 at the top thereof which permits varying the height of the vacuum chamber throat 62. This arrangement permits the vacuum chamber throat 62 height $h_t$ to increase to accommodate the increased, compacted bill height $h_c$. The variable throat height $h_r$ maximizes the vacuum effect on the bill 10b by minimizing the area in the throat 62 around which the vacuum can be drawn without acting on thebill 10. The variable throat height 4 also permits the bill 10b to traverse the vacuum chamber 58 without undue resistance due to the throat 62 being too small for the increased bill height $h_c$ resulting from compaction.

The bill 10 may then be indexed to the compression station 36 in which the bill 10 is compressed to set the pleats P. The compressed bill 10c is illustrated in FIG. 3c. The compression station 36 includes a compression platen 68 against which the bill 10 is compressed, and a ram 70 which is used to compress the bill 10. In the illustrated embodiment, the compression ram 70 is actuated by the vacuum which is used to operate the other portions and stations of the apparatus 20. It will of course be recognized by those skilled in the art that the various stations of the apparatus 20 can be driven by any number of drive systems, including but not limited to electrical, electro-mechanical and pneumatic drive systems.

The compacted bill 10c is then wound into a configuration that facilitates placement into the closure cavity 14. Exemplary of such a configuration is the generally S-shaped configuration 10d illustrated in FIG. 3d. Other relatively round configurations, such as a spiral configuration may also be used to prepare the bill 10 for placement in the closure cavity 14.

The apparatus 20 further includes a winding station 30 following the compacting station 28 to configure the bill 10 for placement in the closure cavity 14. The winding station 30 includes means to grip the bill, such as the exemplary pin plate 72 and pair of depending pins 74a,b, and means to rotate the gripping means relative to the bill 10, such as the winding knob 76. The winding knob 76 is operably connected to the pin plate 72 by a shaft 78.

The compressed bill 10c is positioned in the winding station 30 between the pins 74a,b. In the illustrated embodiment, the pins 74a,b are positioned adjacent to and on either side of the bill 10c, about equidistant between the ends thereof. The pins 74a,b are then rotated relative to the bill 10c which winds the bill, effecting the generally S-shaped configuration 10d, illustrated in FIG. 3d.

The wound bill 10d is then positioned in the cavity 14 of the associated closure 16, as illustrated in FIG. 6. The closure 16 is positioned in a receiver 80 located below the winding station 30. The knob and plate assembly constitute a plunger, which is axially movable relative to the axis of rotation of the plate 72, and is biased by a spring 82, away from the receiver 80. Once the bill 10d is wound, the knob 76 is urged downward, toward the closure cap 16, against the bias, which in turn urges the bill 10d into the closure cavity 14.

It will be recognized by those skilled in the art that the present apparatus 20 can be configured, as illustrated, in a turn-table like arrangement. Alternately, the apparatus can be configured otherwise, such as in a liner motion arrangement and the like. It will also be recognized that the functions of the various stations can be combined or separated, and that the stations and their operation can be partially or fully automated to effect a more efficient and/or faster operation. Such other configurations and automation are intended to be within the scope of the present invention.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A method of compacting and winding a bill comprising:
   providing a bill in a substantially flat state;
   pleating said bill in a first direction to provide a series of substantially similar pleats;
   compacting said pleated bill to set the pleats therein;
   at least partially winding said compacted and pleated bill; and
   positioning said wound bill within a cavity of an associated closure.

2. The method according to claim 1, wherein said pleating step includes directing said bill between intermeshed gear teeth of an associated pair of gears.

3. The method according to claim 1, wherein said compacting step includes collapsing said pleats by aspiration of said pleated bill.

4. The method according to claim 3, wherein said compacting step includes compressing said pleated bill with an associated compression platen.

5. The method according to claim 1, wherein said winding step includes providing gripping means for receiving said compacted bill, and for rotating said gripping means relative to said compacted bill, to wind said bill.

6. The method according to claim 1, wherein said winding step includes winding said bill into a generally S-shaped configuration.

7. The method according to claim 5, wherein said winding step includes winding said bill into a generally S-shaped configuration.

8. The method according to claim 5, wherein said positioning step includes relatively displacing said gripping means axially of an axis about which it rotates.

9. The method according to claim 1, wherein said pleating step pleats said bill in a predetermined manner having a first pleat and a last pleat, said first and last pleats being of a substantially equal size and being similarly oriented.

10. An apparatus for compacting and winding a bill for positioning the bill in a cavity of an associated closure comprising:
   a support frame;
   a pleating station, mounted to said support frame, for pleating the bill in a predetermined configuration;
   a compacting station, mounted to said support frame, for compacting said pleated bill into a compacted state;
   a winding station mounted to said support frame having a winding member adapted to engage said compacted bill and to wind said bill into a generally circular orientation; and
   a discharge region adapted to move said wound bill from said winding station, and to position said wound bill in the cavity of the associated closure.

11. The bill compacting and winding apparatus according to claim 10 wherein said pleating station includes a pair of gears having gear teeth thereon, said gears being positioned relative to one another to intermesh said gear teeth.

12. The bill compacting and winding apparatus according to claim 10 wherein said compacting station includes a vacuum station having a vacuum chamber, said chamber being in flow communication with a vacuum manifold and being configured to draw a vacuum in said vacuum chamber, said vacuum chamber being adapted to receive said pleated bill and to compact said pleated bill by aspiration of said bill in said chamber.

13. The bill compacting and winding apparatus according to claim 12 wherein said vacuum chamber defines a throat having a predetermined cross-sectional flow area, and wherein said throat includes means for varying said flow area thereof.

14. The bill compacting and winding apparatus according to claim 13 wherein said varying means includes an articulating plate.

15. The bill compacting and winding apparatus according to claim 10 wherein said compacting station includes a compression station having a compression platen and a compression ram configured to coact with one another to compress said pleated bill therebetween to set said pleats.

16. The bill compacting and winding apparatus according to claim 10 wherein said winding station includes means for gripping said bill and winding said bill in a predetermined, generally round configuration.

17. The bill compacting and winding apparatus according to claim 16 wherein said gripping means includes a pair of pins adapted to grip said compacted bill intermediate ends thereof and further adapted to rotate about an axis relative to said compacted bill to effect a wound, generally S-shaped configuration.

18. The bill compacting and winding apparatus according to claim 17 wherein at least a part of said winding station is adapted to move axially of said axis of rotation to position said wound bill in an associated closure.

* * * * *